3,255,256
// PURIFICATION OF ALCOHOLS
// Donald B. Miller, Ponca City, Okla., assignor to Continental Oil Company, Ponca City, Okla., a corporation of Oklahoma
// No Drawing. Filed Sept. 12, 1960, Ser. No. 55,171
// 6 Claims. (Cl. 260—632)

This invention relates to the purification of high molecular weight alkyl alcohols. In one aspect, it relates to the purification of alcohol residue obtained from the fractionation of alcohols which are produced by the hydrolysis of mixtures of aluminum alkoxides.

It is an object of this invention to provide an improved process for the purification of high molecular weight alcohols.

It is another object of this invention to provide an improved process for purifying high molecular weight alcohols obtained by the hydrolysis of complex mixtures of aluminum alkoxides.

Still another object of this invention is to provide an improved process for recovering high molecular weight alcohols from impurities which are difficulty separable by distillation.

These and other objects of the invention will become more readily apparent from the following detailed description and discussion.

The foregoing objects are achieved broadly by reacting an admixture of high molecular weight alkanols containing impurities comprising esters, paraffins, olefins, and aldehydes with a low molecular weight aluminum alkoxide or aluminum alkyl to convert the high molecular weight alcohols to substantially nonvolatile aluminum alkoxides and thereafter separating the impurities by volatilization. The alcohols are then regenerated from the alkoxides by hydrolysis.

The reactions which occur in the conversion of the high molecular weight alcohols to alkoxides can be expressed generally as follows:

(1) $\quad 3ROH + Al(R_1)_3 \rightarrow Al(OR)_3 + 3R_1H$
(2) $\quad 3ROH + Al(OR_1)_3 \rightarrow Al(OR)_3 + 3R_1OH$ wherein R represents an admixture of high molecular weight alkyl groups and $R_1$ represents a low molecular weight alkyl group.

While the process of this invention finds application generally in the purification and recovery of high molecular weight alkanols from impurities which are difficultly separable therefrom by distillation, it finds particular application in the treatment of alcohols which are obtained by the hydrolysis of complex mixtures of aluminum alkoxides and, in particular, alcohols which are prepared from the oxidation and subsequent hydrolysis of complex aluminum alkyls as described in U.S. Patent 2,892,858 to Karl Ziegler. Briefly, in this process a simple aluminum alkyl, such as aluminum triethyl, is grown (reacted) continuously with an olefin, such as ethylene, whereby complex aluminum alkyls are formed. The complex aluminum alkyls are then oxidized with oxygen (air) to form aluminum alkoxy compounds. Hydrolysis of the alkoxy compounds provides a mixture of alcohols, olefins, paraffins, and minor amounts of oxygenated compounds such as aldehydes. The alcohols which are formed in this reaction have a composition following a Poisson distribution and ranging from ethanol to about 1-triacontanol.

Various impurities are present in alcohols prepared in the foregoing manner and also by other methods. These impurities include hydrocarbon materials, such as paraffins and olefins, and a variety of oxygenated compounds, including materials such as aldehydes, esters, and the like.

The low molecular weight, lower boiling alcohols can be separated from the high molecular weight alcohols and the various impurities by fractional distillation. The impurities and higher alcohols, however, are sufficiently close in boiling points that their separation by distillation is extremely difficult. The purification of the higher alcohols by ordinary fractional distillation is also limited by the lack of thermal stability of the alcohols and the impurities at the high temperatures necessary for such distillations.

The residue which remains after distillation of the lower molecular weight alcohols comprises waxy and semisolid alcohols containing between about 20 and about 30 carbon atoms and the various impurities set forth above. Usually this residue constitutes between about 10 and about 15 percent of the original alcohol mixture, and the alcohol content of the residue is generally between about 40 and about 80 percent.

The low molecular weight aluminum alkoxides and aluminum alkyls which are employed in the process for reaction with the alcohols include, preferably, compounds in which the alkyl group contains from one to about five carbon atoms. Usually higher molecular weight compounds are not employed; however they can be if desired. Specific compounds which are used include aluminum isopropoxide, aluminum ethoxide, aluminum n-butoxide, triethylaluminum, tri-n-pentylaluminum, triisopropylaluminum, and the like.

The reaction between the alcohols and the low molecular weight aluminum alkyl as shown in Equation 1 is rapid and essentially irreversible and hence can be carried out at any convenient temperature, the range from about 0° C. to about 150° C. being quite satisfactory. The reaction between higher alcohols and the low molecular weight aluminum alkoxide as shown in Equation 2 is also rapid but is reversible. The reaction is forced to completion by operating at such temperature and pressure that the low molecular weight alcohol is continuously removed by volatilization. Ordinarily this can be accomplished merely by heating at atmospheric pressure. The use of reduced pressure will, however, facilitate the removal of the low molecular weight alcohol. The low molecular weight alkoxide or alkyl is preferably employed in stoichiometric amounts or greater to assure complete conversion of the alcohols to alkoxides.

The alkoxides which are formed in the process of the invention are substantially nonvolatile and thus can be readily separated from the various impurities by distillation under suitable conditions. The distillation step involves low pressures, usually below about one millimeter of mercury. Preferably, the separation is carried out in a molecular still below about 20 microns of mercury and at temperatures ranging from about 100 and about 200° C. As in any distillation process, the efficiency of the separation is dependent on the number of distillation stages which are employed.

The purified alkoxides which remain after distillation are hydrolyzed to regenerate the high molecular weight alcohols. The hydrolysis step can be carried out in a conventional manner utilizing any suitable hydrolyzing material, such as an inorganic acid, water, or inorganic bases. The hydrolysis step ordinarily is carried out at 50–100° C. employing a stoichiometric or greater amount of the hydrolyzing agent. Since the high molecular weight alcohols are waxy semisolids and solids at room temperature, it is desirable to have present during hydrolysis materials which can act as a solvent for the alcohols. For this purpose, conventional solvents, such as benzene, isopropanol, etc., are employed.

The following examples are presented in illustration of the invention:

Example 1

Eight hundred grams of alcohol bottoms [1] and 100 grams of aluminum isopropoxide were heated together, and the isopropanol was removed as it was formed. After 60 ml. of isopropanol has been removed, the remainder of the aluminum isopropoxide (55 grams) was added and the heating continued. In all, 116 grams of isopropanol (94 percent) was obtained.

The product was stripped on a molecular still at successively increasing temperatures. The material was recycled at each temperature until volatilization nearly stepped; then the temperature was raised, and the stripping continued as before. Fractions were taken at 120, 140, 165, and 185° C. In all, 276 grams were taken overhead. The nonvolatile residue was hydrolyzed by mixing with 200 ml. of benzene, 200 ml. of isopropanol, and 400 ml. of 25 percent sulfuric acid at 70° C. for 15 minutes. The aqueous layer was removed, and the organic layer was washed with dilute hydrochloric acid and then washed several times with water. After treatment with activated carbon and attapulgus clay, the product was filtered and the solvents removed at reduced pressure. The product (478 grams) was essentially free of olefins and carbonyl (infrared). Alumina adsorption analysis showed the presence of 4.3 percent hydrocarbons as compared with 18.9 percent in the unpurified bottoms.

Example 2

One liter of xylene and 127 grams of a 50 percent triethylaluminum-kerosene solution were transferred under nitrogen to a 5-liter flask. To this mixture was slowly added 801 grams alcohol bottoms. [2] The addition was begun at 20–25° C., and the temperature was allowed to rise gradually. Later, heating was used; and the last portion of bottoms was added to the refluxing mixture. The ethane evolution was noted with the aid of a wet test meter. The ethane evolution stopped before all the bottoms had been added, indicating that the triethylaluminum had all been consumed. After all the bottoms had been added, triethylaluminum was added until no further ethane was evolved. With the addition of a slight excess of triethylaluminum (ca. 105 grams AlEt$_3$ was used in all), the reaction was stopped, the xylene stripped at reduced pressure, and the product then stripped on the molecular still. By stripping to a temperature of 185° C., 205 grams of impurities were removed. The purified alcohol bottoms were recovered by hydrolyzing the stripped aluminum alkoxides in the manner described in Example 1. There was obtained 517 grams of purified bottoms, which by alumina adsorption analysis showed the presence of 4.3 percent hydrocarbon impurities, as compared with 24.3 percent in the unpurified bottoms.

---

[1] The alcohol bottoms employed were obtained as follows:
(1) Triethylaluminum was reacted with ethylene to form a growth product having an m value of 3.8 to 3.9 (m value is the average number of ethylene units added to each alkyl aluminum bond of the aluminum triethyl).
(2) The growth product of (1) was oxidized with air.
(3) The oxidized growth product of (2) was hydrolyzed with excess 25 percent sulfuric acid.
(4) The alcohol mixture obtained in step (3) was batch distilled at 0.4 mm. of mercury to an overhead temperature of 163° C. and a bottoms temperature of 227° C. The residue remaining was the alcohol bottoms which had the following analysis: hydroxyl number, 4.35; saponification number, 14.4; bromine number, 6.8; acid number, 0.51; and carbonyl number, 1,000.

[2] The alcohol bottoms employed in this example were obtained in accordance with the same procedure as those used in Example 1 except that the batch distillation of the alcohols was carried out at 2 mm. of mercury to an overhead temperature of 198° C. and a bottoms temperature of 249° C. These alcohol bottoms had a hydroxyl number of 3.74; saponification number, 20.4; bromine number, 7.3; acid number, 0.21; and carbonyl number, 1,200.

Having thus described the invention by providing specific examples thereof, it is to be understood that no undue limitations or restrictions are to be drawn by reason thereof and that many variations and modifications are within the scope of the invention.

I claim:

1. In a process in which aluminum alkyd is reacted with a low molecular weight olefin to form a higher molecular weight aluminum alkyl, in which said higher molecular weight alkyl is oxidized to aluminum alkoxide, in which said aluminum alkoxide is hydrolyzed to provide a product comprising alcohols and impurities including esters, paraffins, olefines, and aldehydes, and in which said product is fractionated to recover lower molecular weight alcohols, leaving a residue of high molecular weight alcohols and said impurities, the improvement which comprises (a) reacting said residue with a material selected from the group consisting of low molecular weight aluminum alkoxide and aluminum alkyl, whereby said high molecular weight alcohols are converted to substantially nonvolatile aluminum alkoxides, (b) separating said impurities therefrom by volatilization and (c) regenerating said high molecular weight alcohols from said nonvolatile alkoxides.

2. The process of claim 1 in which the low molecular weight aluminum alkoxide is aluminum isopropoxide.

3. The process of claim 1 in which the low molecular weight aluminum alkyl is aluminum triethyl.

4. In a process in which aluminum alkyl is reacted with a low molecular weight olefin to form a higher molecular weight aluminum alkyl, in which said higher molecular weight alkyl is oxidized to aluminum alkoxide, in which said aluminum alkoxide is hydrolyzed to provide a product comprising alcohols and impurities, including esters, paraffins, olefins, and aldehydes, and in which said product is fractionated to recover lower molecular weight alcohols, leaving a residue of high molecular weight alcohols and said impurities, the improvement which comprises (a) reacting said residue with a material selected from the group consisting of low molecular weight aluminum trialkoxide and aluminum trialkyl, whereby said high molecular weight alcohols are converted to substantially nonvolatile aluminum alkoxides, (b) stripping said impurities from said nonvolatile aluminum alkoxides at a temperature between about 100 and about 200° C. and a pressure below about 20 microns of mercury and (c) thereafter hydrolyzing said nonvolatile alkoxide to regenerate said high molecular weight alcohols.

5. The process of claim 4 in which the low molecular weight aluminum alkoxide is aluminum isopropoxide.

6. The process of claim 4 in which the low molecular weight aluminum alkyl is aluminum triethyl.

References Cited by the Examiner

UNITED STATES PATENTS

| | | | |
|---|---|---|---|
| 2,863,895 | 12/1958 | Kirshenbaum et al. | 260—632 |
| 2,892,858 | 6/1959 | Ziegler | 260—617 X |
| 2,897,244 | 7/1959 | Selwitz | 260—643 |
| 2,975,201 | 3/1961 | Dickey et al. | 260—632 |
| 3,017,438 | 1/1962 | Atwood | 260—632 |
| 3,030,402 | 4/1962 | Kirshenbaum et al. | 260—632 |
| 3,042,696 | 7/1962 | Aldridge | 260—632 |

FOREIGN PATENTS

| | | |
|---|---|---|
| 731,216 | 6/1955 | Great Britain. |
| 767,601 | 2/1957 | Great Britain. |

OTHER REFERENCES

Handbook of Chemistry and Physics, 37th Ed., 1955–6, pp. 466–9.

LEON ZITVER, *Primary Examiner.*

CHARLES B. PARKER, *Examiner.*